UNITED STATES PATENT OFFICE.

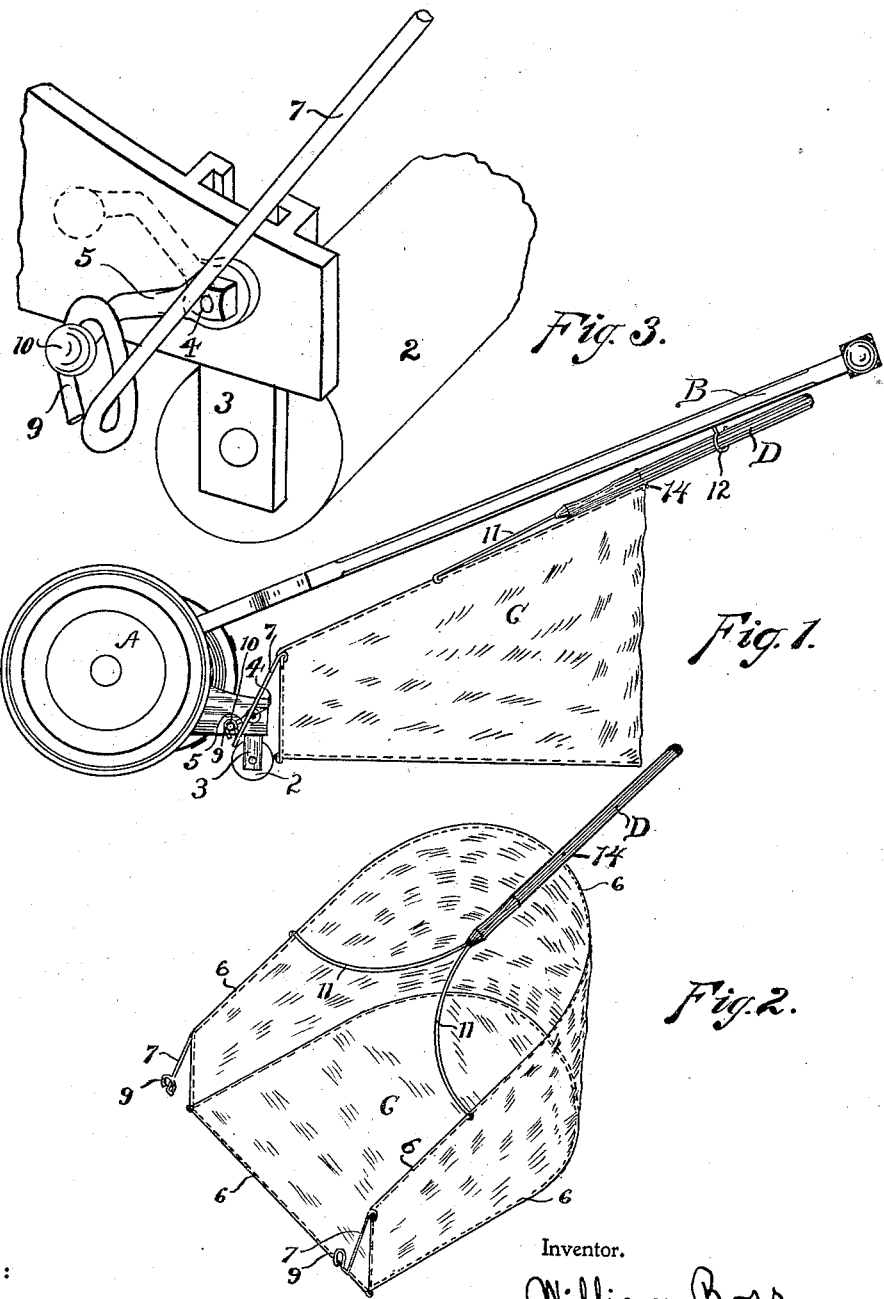

WILLIAM BOSS, OF ST. PAUL, MINNESOTA.

LAWN-MOWER.

SPECIFICATION forming part of Letters Patent No. 701,255, dated May 27, 1902.

Application filed August 28, 1900. Serial No. 28,329. (No model.)

*To all whom it may concern:*

Be it known that I, WILLIAM BOSS, a citizen of the United States, residing at St. Paul, in the county of Ramsey and State of Minnesota, have invented certain new and useful Improvements in Lawn-Mowers, of which the following is a specification.

My invention relates to improvements in grass-collectors for lawn-mowers; and it consists in the features of construction and combination hereinafter specifically described and claimed.

The object of my invention is to provide a receptacle and means for so supporting it on the mower that it can be grasped by the handle and lifted directly from the mower, so that it may be carried away and its contents emptied.

My invention also consists in improvements in the construction of the receptacle and means of attachment, whereby it can be easily adapted and attached to mowers of different construction and size.

In the accompanying drawings, forming part of this specification, Figure 1 is a side elevation of a mower fitted with my improved receptacle. Fig. 2 is a perspective view of the receptacle, and Fig. 3 is a detail view showing the means for supporting the forward end of the receptacle upon the mower.

In the drawings, A represents a lawn-mower of ordinary construction provided with a handle-bar B, by means of which the mower is pushed over the ground. The frame of the mower is provided upon its rear portion with the ordinary roller 2, supported in the side bars 3 of the mower by bolts 4. These bolts preferably carry brackets 5, as shown in Fig. 3, to support the forward end of the grass-catching receptacle C. The receptacle C is made up of canvas or other suitable material mounted upon a suitable framework. In the drawings this framework is shown made up of pieces of wire 6, looped together. The free ends 7 of the pieces of wire which form the top of the receptacle are bent downward and formed with bent ends 9, adapted to fit over the brackets 5, as shown in Fig. 3. Each bracket 5 has a headed outer end 10 and has swivel-support at its inner end upon the bolt 4. The receptacle C is provided with a suitable handle D, connected with the sides of the top of the frame-wires 6 by diverging wires 11, and is connected with the rear of the frame 6 by a rivet or other equivalent device 14. As shown in Fig. 1, the handle B is removably connected with the handle of the mower by means of a hook 12, carried by the handle of the mower and adapted to receive the handle of the grass-receptacle. To adjust the height of the receptacle C, the brackets 5 are turned upon the supporting-bolts 4, and to change the width of the open end of the receptacle to accommodate the same to different sizes of mowers the upwardly-turned ends 9 of the wires are bent laterally, and the free ends 7 of the wires may also be bent to assist in fitting the receptacle to the mower.

In use the receptacle is connected with the lawn-mower in the manner shown in Fig. 1. When the same is filled with cut grass, the handle D is disconnected from the hook 12, when the receptacle can be lifted directly from the mower and used to carry the grass to the desired emptying-place, the handle being employed for the purpose of supporting the same at this time. When it is emptied, it can be replaced upon the brackets 5 and the handle of the receptacle reëngaged with the hook 12 without the manipulating of any connecting parts.

I am aware that it is not new to provide lawn-mowers with grass-collecting receptacles; but in my construction the receptacle is provided with a handle and removably supported from the handle of the mower and made with a construction of frame-support which makes it more easily handled and more effective than the ordinary construction.

I claim—

1. In combination with a lawn-mower frame and handle, and brackets swiveled to the sides of said frame and having heads at their outer ends; a grass-catching receptacle comprising a frame of wire having its front ends bent downward and removably engaged with said brackets inside their heads, a handle secured to this frame, and means for detachably connecting this handle with the handle of the lawn-mower.

2. In combination with a lawn-mower frame and handle, and brackets carried by the former; a grass-catching receptacle comprising a frame of wire whose front ends detachably engage said brackets, a handle connected to the rear of said frame, wires diverging from the front end of this handle and connected with the sides of the frame, and a hook on the lawn-mower handle detachably engaging the handle of the frame.

3. In combination with a lawn-mower frame and handle, and brackets carried by the frame; a grass-catching receptacle whose front ends detachably engage with said brackets, a straight handle rigidly secured to the rear of said receptacle, said handle projecting rearwardly parallel with the mower-handle when the receptacle is in position, and a hook detachably supporting said receptacle-handle underneath said mower-handle.

In testimony whereof I affix my signature in presence of two witnesses.

WILLIAM BOSS.

Witnesses:
ELGIE H. EVANS,
H. S. JOHNSON.